United States Patent [19]
Nian

[11] Patent Number: 5,887,290
[45] Date of Patent: Mar. 30, 1999

[54] WATERLESS TOILET SYSTEM

[76] Inventor: Chin Fu Nian, No. 24 Minchou Street, Yuli, Hualian Hsien, Taiwan

[21] Appl. No.: 48,047

[22] Filed: Mar. 26, 1998

[51] Int. Cl.$^6$ ..................................................... A47K 11/02
[52] U.S. Cl. ................................... 4/111.1; 4/111.6; 4/484
[58] Field of Search ................ 4/319, 320, 111.1–111.6, 4/449, 479, 484

[56] References Cited

U.S. PATENT DOCUMENTS

| | | | |
|---|---|---|---|
| 1,764,149 | 6/1930 | Cadwallader | 4/484 |
| 2,835,215 | 5/1958 | Harm | 4/111.2 |
| 3,317,047 | 5/1967 | Hansen | 4/320 |
| 3,675,250 | 7/1972 | Bengtsson | 4/484 |
| 3,837,012 | 9/1974 | Rassbach et al. | 4/111.4 |
| 4,254,515 | 3/1981 | Kiyama et al. | 4/111.1 |

Primary Examiner—Charles R. Eloshway
Attorney, Agent, or Firm—Bacon & Thomas, PLLC

[57] ABSTRACT

A waterless toilet system includes a toilet bowl unit, the toilet bowl unit including a bowl, the bowl having a top rim and a bottom outlet, and a locating ring pivoted to the bowl and closed on the rim to hold a bag in the bowl in an opened condition for collecting waste matter discharged from the user, a crushing and separating machine disposed below the toilet bowl unit, the crushing and separating machine including a crushing container, a water separation container, and a motor, the crushing and separating machine being operated to cut waste matter received from the bowl and to separate waste water from solid waste matter, and a housing which holds the toilet bowl unit and the crushing and separating machine, the housing having a storage chamber for holding solid waste matter delivered from the crushing and separating machine, and a dryer controlled to dry collected solid waste matter.

8 Claims, 3 Drawing Sheets

WATERLESS TOILET SYSTEM

BACKGROUND OF THE INVENTION

The present invention relates to a sanitary equipment, and more particularly to a waterless toilet system.

A regular toilet system uses flushing water to flush waste matter from the bowl. In order to save the consumption of water, various water-saving toilet systems have been developed, and have appeared on the market. However, these water-saving toilet systems still need to use water for carrying waste matter away from the bowl. When waste matter is carried away from the bowl with water and directly delivered to a ditch or river, it will cause an environmental pollution problem. If decomposing waste matter before drainage, a big scale cesspool must be built up. Furthermore, because regular toilet systems are fixedly mounted on the ground or in a building, they are not movable.

SUMMARY OF THE INVENTION

It is one object of the present invention to provide a waterless toilet system which is comfortable in use, and keeps the bowl clean without using flushing water. It is another object of the present invention to provide a waterless toilet system which receives and treats waste matter discharged from the user without consuming water. It is still another object of the present invention to provide a waterless toilet system which is movable. According to one aspect of the present invention, the waterless toilet system comprises a toilet bowl unit, a crushing and separating machine, and a housing. The toilet bowl unit comprises a bowl and a locating ring, the bowl having a top rim and a bottom outlet, the locating ring being pivoted to the bowl and closed on the rim to hold a bag in the bowl in an opened condition for collecting waste matter discharged from the user. When the locating ring is lifted from the bowl, the waste matter collected bag immediately falls from the bowl to the crushing and separating machine through the bottom outlet of the bowl for further treatment.

According to another aspect of the present invention, the crushing and separating machine is disposed below the toilet bowl unit, and comprised of a crushing container, a water separation container, and a motor. The crushing and separating machine is operated to cut waste matter received from the bowl, and to separate waste water from solid waste matter.

According to still another aspect of the present invention, the housing holds the toilet bowl unit and the crushing and separating machine. The housing comprises a storage chamber for holding solid waste matter delivered from the crushing and separating machine, and dryer means for example an electric heater controlled to dry collected solid waste matter.

Furthermore, the bags used for collecting waste matter discharged from the user can be paper bags, or weather decomposable polybags. The crushing and separating machine can be started manually or automatically. The manual control or automatic control can easily be achieved by known techniques.

DETAILED DESCRIPTION OF THE PREFERRED EMBODIMENT

Figure 1:
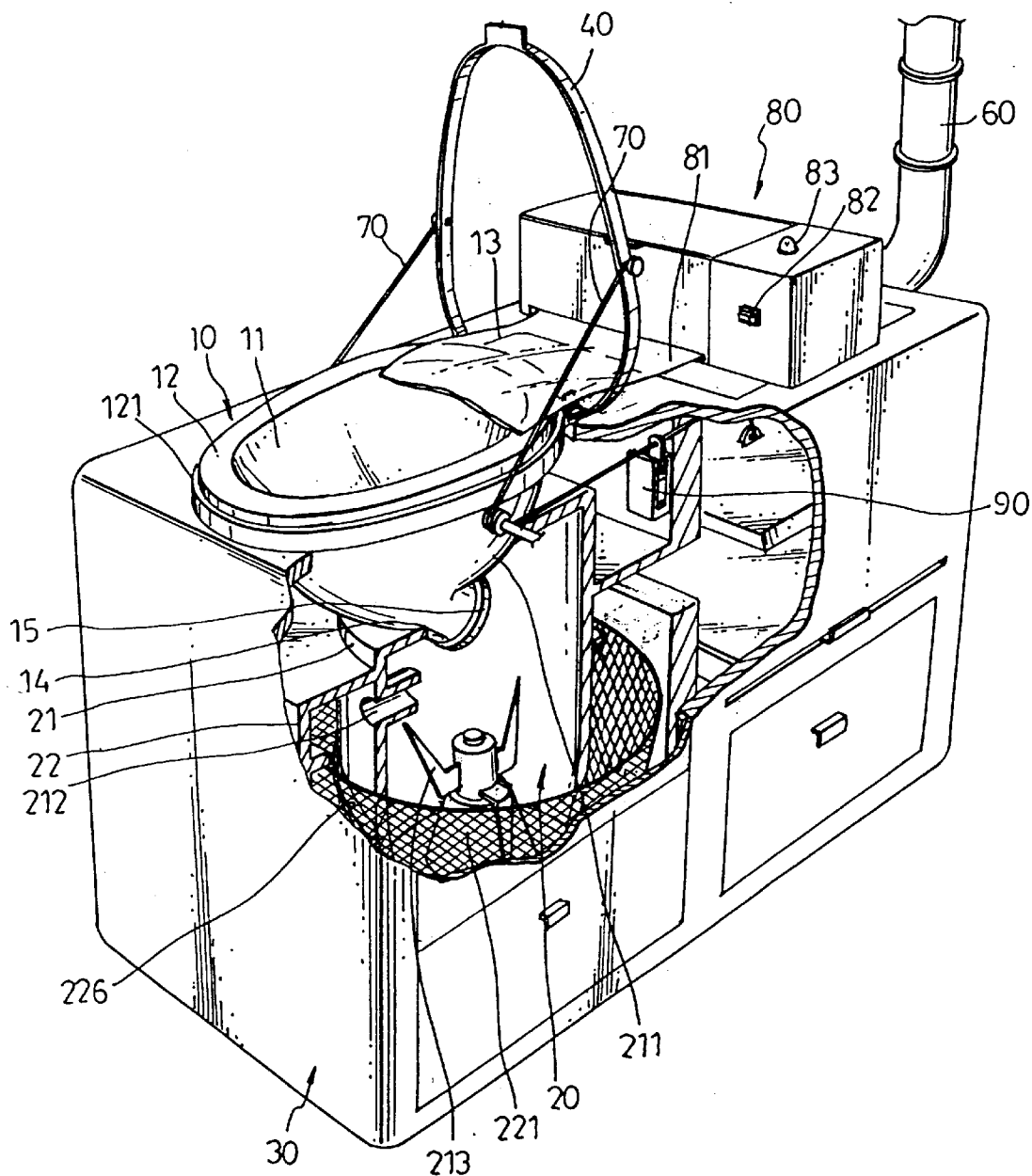
FIG. 1 is a cutaway view of a waterless toilet system according to the present invention.
Figure 2:
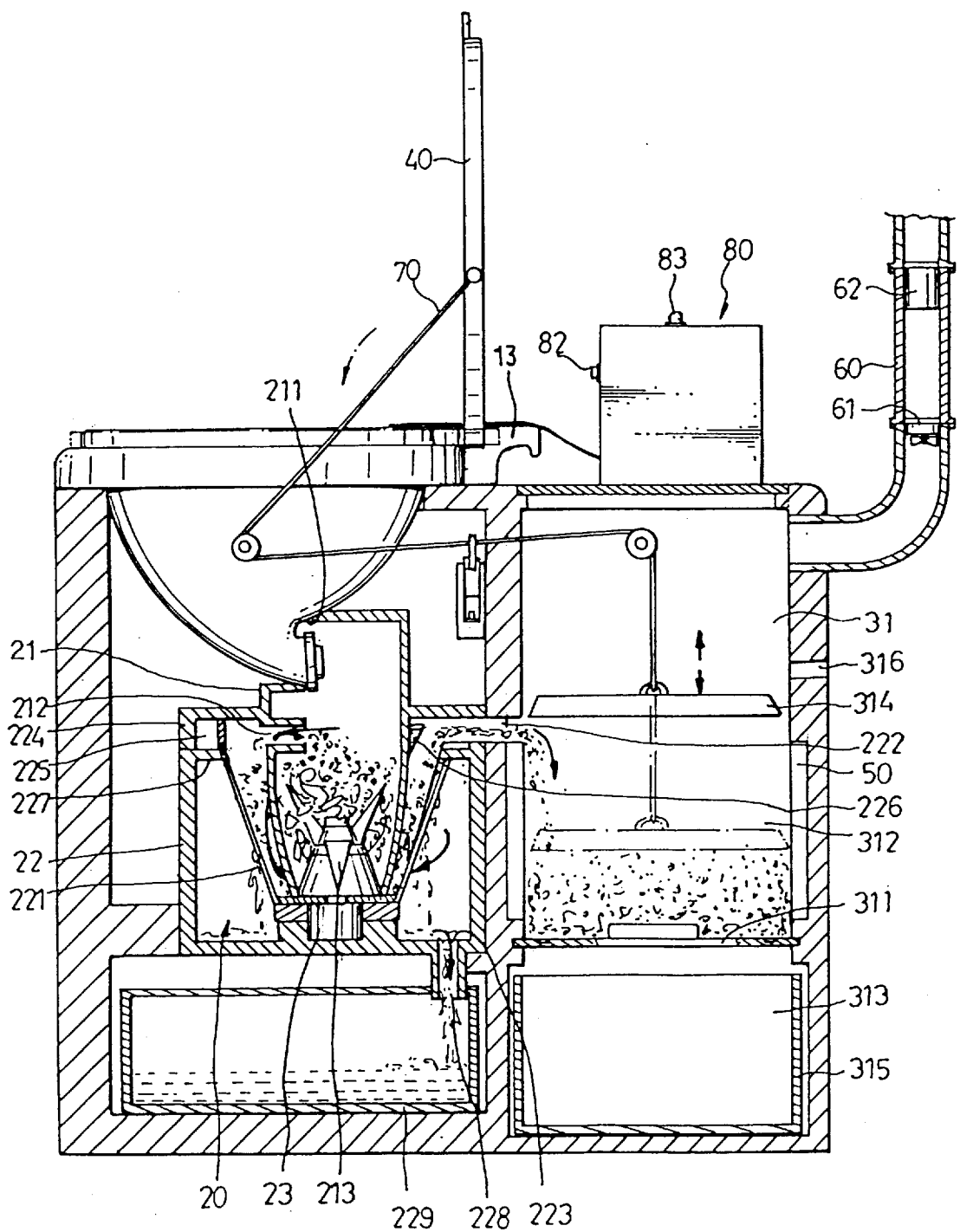
FIG. 2 is a sectional view of the present invention, showing the crushing and separating machine operated.

Referring to FIGS. 1 and 2, a waterless toilet system in accordance with the present invention is generally comprised of a toilet bowl unit 10, a crushing and separating machine 20, and a housing 30. The toilet bowl unit 10 and the crushing and separating machine 20 are mounted in the housing 30. The housing 30 is movable, so that the waterless toilet system can be conveniently carried from place to place.

The toilet bowl unit 10 comprises a bowl 11. The bowl 11 comprises a top rim 12, a locating groove 121 around the top rim 12, a back flange 13 horizontally outwardly raised from the top rim 12, and a bottom outlet 14. A locating ring 40 is pivoted to the back flange 13 of the toilet bowl unit 10. When the locating ring 40 is closed on the bowl 11, it is forced into engagement with the locating groove 121 around the top rim 12. An one-way piston 15 is provided and controlled to close the bottom outlet 14 and to stop bad smell from escaping out of the waterless toilet system into the house.

The crushing and separating machine 20 is mounted inside the housing 30 below the toilet bowl unit 10. The crushing and separating machine 20 comprises a crushing container 21, a water separation container 22, and a motor 23. The crushing and separating machine 20 cuts bags and waste matter into pieces, and separates solid matter from water. The crushing container 21 comprises a top opening 211 disposed in communication with the bottom outlet 14 of the bowl 11 of the toilet bowl unit 10, a reamer 213, and a side outlet 212 connected to the water separation container 22. The water separation container 22 comprises a strainer 221, a top outlet 222, and a bottom drain port 223. The top cover 224 of the water separation container 22 has a guide board 225. A scraper 226 is fixed to the outside wall of the crushing container 21. The scraper 226 is disposed in contact with the strainer 221. When the strainer 221 is rotated, waste matter is removed from the strainer 221 by the scraper 226. A partition board 227 is mounted inside the water separation container 22 around the top opening of the strainer 221 for holding solid waste matter and guiding solid waste matter through the top outlet 222 into a storage chamber 31 inside the housing 30.The motor 23 is controlled to turn the reamer 213 and the strainer 221. A dryer 50 is provided in the storage chamber 31, and operated to dry solid matter in the storage chamber 31. A sliding partition board 311 is mounted in the storage chamber 31. The sliding partition board 311 divides the storage chamber 31 into an upper chamber 312 and a lower chamber 313. A receptacle 315 is provided inside the lower chamber 313. A pressure board 314 is moved vertically in the upper chamber 312. The pressure board 314 is connected to the locating ring 40 by ropes 70. By means of the ropes 70, the locating ring 40 and the pressure board 314 are moved synchronously.

Referring to FIG. 2 again, an exhaust pipe 60 is connected to the upper chamber 312 of the storage chamber 31 for guiding waste gas out of the housing 30. A fan 61 and an air filter 62 are provided in the exhaust pipe 60. An air inlet 316 is provided at the upper chamber 31 through which outside air passes to the inside of the storage chamber 31.

Referring to FIGS. 1 and 2 again, a box 80 is provided at the top side of the housing 30 adjacent to the toilet bowl unit 10. The box 80 holds a bag roll (not shown). When in use, one bag 81 is pulled out of the box 80, and secured to the top rim 12 of the bowl 11 in an opened condition by the locating ring 40 for collecting waste matter discharged from the user.

After each use, the locating ring 40 is lifted from the top rim 12 of the bowl 11, enabling the waste matter contained bag 81 to fall to the bottom outlet 14 of the bowl 11 (The bottom outlet 14 extends vertically downwardly or obliquely downwardly from the cavity defined within the bowl 11, so that the waste matter contained bag 81 can be guided by the bottom outlet 14 to the crushing and separating machine 20.

Figure 3:
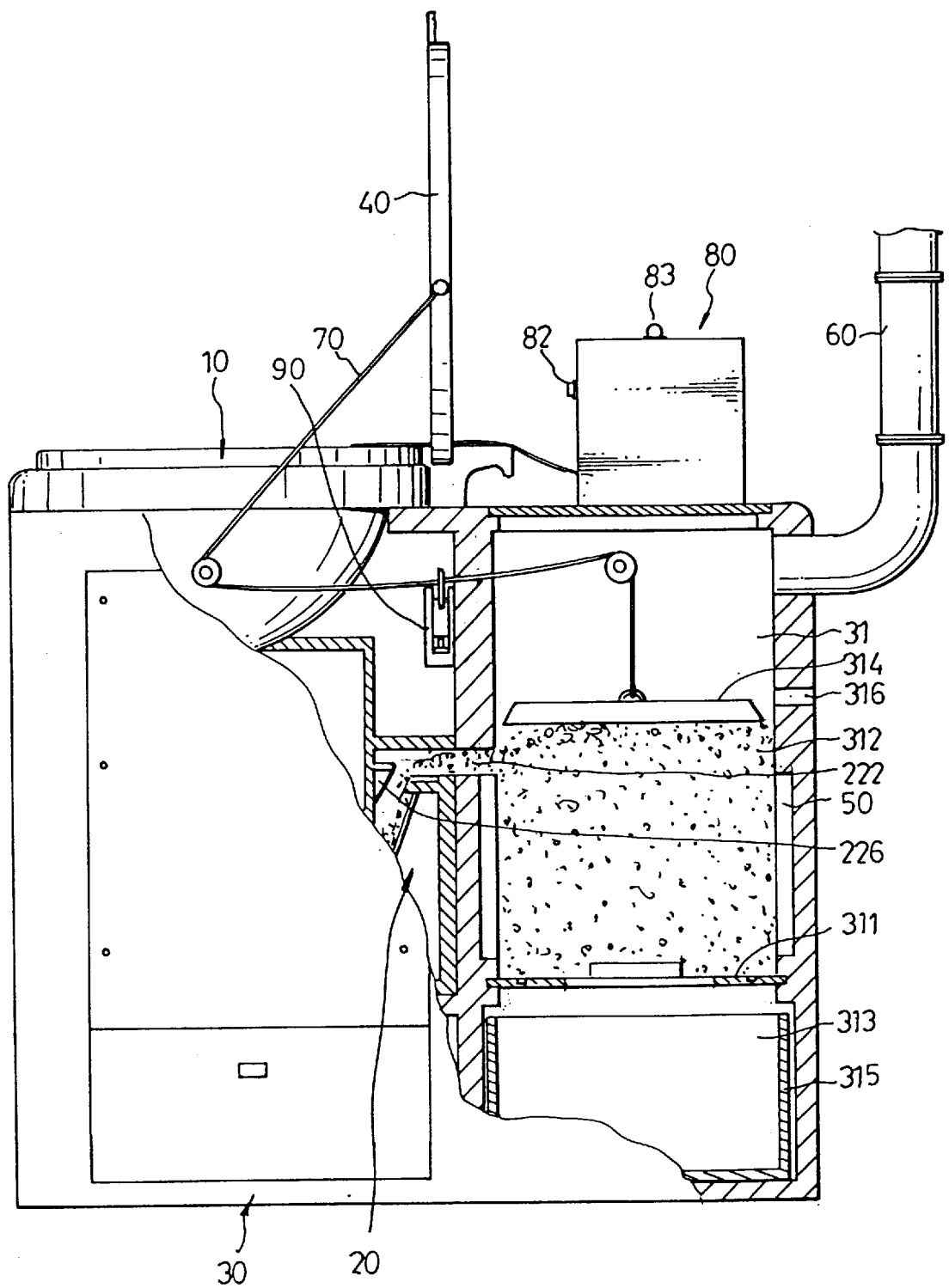
FIG. 3 is another sectional view of the present invention, showing solid waste matter accumulated in the storage chamber.

Referring to FIG. 3 and FIG. 2 again, the waste matter contained bag 81 which comes from the bottom outlet 14 of the bowl 11 falls to the crushing container 21. At the same time, the reamer 213 is rotated by the motor 23 to cut the waste matter contained bag 81 into pieces. When a certain amount of waste matter is accumulated in the crushing container 21, it is forced to flow over the crushing container 21 to the strainer 221 of the water separation container 22, enabling waste water to flow through the drain port 223 of the water separation container 22 to the outside via a drain pipe 228. Solid matter is removed from the strainer 221 by the scraper 226 and pushed into the top outlet 222 and the upper chamber 312 of the storage chamber 31 for storage and drying. When the locating ring 40 is lowered and fastened to the locating groove 121 on the bowl 11 during a next use of the waterless toilet system, the pressure board 314 is lowered to compact accumulated solid waste matter, so as to diminish space occupation of accumulated solid matter.

Referring to FIG. 3 again, a sensor 90 is mounted on one rope 70. When accumulated waste matter reaches a certain volume, the sensor 90 is induced to give a warning signal. The warning signal can be a visual warning signal or an audio warning signal. The sensor 90 can be obtained from the known art. Because the structure of the sensor 90 is not within the scope of the invention, it is not described in detail.

When removing accumulated solid waste matter from the upper chamber 312, the sliding partition board 311 is moved out of the storage chamber 31, enabling accumulated solid waste matter to fall to the receptacle 315 in the lower chamber 313 for further disposal.

Referring to FIG. 1 again, a control switch 82 is mounted on the box 80 for controlling the operation of the crushing and separating machine 20. A signal light 83 is mounted on the box 80, and controlled to produce a visual warning signal by the sensor 90.

While only one embodiment of the present invention has been shown and described, it will be understood that various modifications and changes could be made thereunto without departing from the spirit and scope of the invention disclosed.

What the invention claimed is:

1. A waterless toilet system comprising:

a toilet bowl unit, said toilet bowl unit comprising a bowl, said bowl having a top rim around a top opening thereof and a bottom outlet in communication with said top opening, a locating ring pivoted to said bowl for closing on said top rim to hold a bag in said bowl in an opened condition, said bottom outlet extending downwardly from the top opening of said bowl;

a crushing and separating machine disposed below said toilet bowl unit and connected to the bottom outlet of said bowl, said crushing and separating machine comprising a crushing container, a water separation container, and a motor, said crushing and separating machine being operated to crush waste matter received from said bowl and to separate waste water from solid waste matter; and a housing which holds said toilet bowl unit and said crushing and separating machine, said housing comprising a storage chamber for holding solid waste matter delivered from said crushing and separating machine, and dryer means controlled to dry collected solid waste matter.

2. The waterless toilet system of claim 1, wherein said crushing container comprises a top opening connected to the bottom outlet of said bowl, a reamer driven by said motor to cut waste matter into pieces, and a side outlet for guiding cut waste matter out of said crushing container to said water separation container.

3. The waterless toilet system of claim 1, wherein said water separation container comprises a strainer mounted around said crushing container and rotated by said motor, a top outlet through which solid waste matter is guided to said storage chamber, and a bottom drain port through which waste water is guided out of said housing.

4. The waterless toilet system of claim 3, wherein said crushing container comprises a fixed scraper disposed in contact with said strainer for removing waste matter from said strainer when said strainer is rotated by said motor.

5. The waterless toilet system of claim 1, wherein said storage chamber comprises an upper chamber for collecting solid waste matter from said crushing and separating machine, a sliding partition board, a movable pressure board moved vertically above said sliding partition board for compacting solid waste matter collected in said upper chamber, a lower chamber separated from said upper chamber by said sliding partition board, and a receptacle mounted in said lower chamber.

6. The waterless toilet system of claim 4, wherein said pressure board is coupled to said locating ring of said toilet bowl unit by two ropes for a synchronous movement with said locating ring.

7. The waterless toilet system of claim 1, including a piston controlled to close/open the bottom outlet of said bowl.

8. The waterless toilet system of claim 1, wherein said toilet bowl unit comprises a box mounted on said housing adjacent to said bowl, said box holding a bag roll.

* * * * *